US006070763A

United States Patent [19]

Gueret

[11] Patent Number: 6,070,763

[45] Date of Patent: Jun. 6, 2000

[54] DISPENSER PUMP FOR A LIQUID OR PASTY PRODUCT

[75] Inventor: Jean-Louis H. Gueret, Paris, France

[73] Assignee: L'Oreal, Paris, France

[21] Appl. No.: 09/108,289

[22] Filed: Jul. 1, 1998

[30] Foreign Application Priority Data

Jul. 2, 1997 [FR] France .................................. 97 08468

[51] Int. Cl.[7] .......................... B65D 35/28; B65D 35/56; G01F 11/00

[52] U.S. Cl. .......................... 222/95; 222/105; 222/260; 222/321.9; 222/385

[58] Field of Search ............................ 222/95, 105, 256, 222/260, 321.7, 321.9, 380, 385

[56] References Cited

U.S. PATENT DOCUMENTS

| | | | |
|---|---|---|---|
| 3,877,616 | 4/1975 | Stevens . | |
| 4,479,593 | 10/1984 | Bundschuh . | |
| 5,409,146 | 4/1995 | Hazard et al. . | |
| 5,492,252 | 2/1996 | Gueret | 222/207 |
| 5,642,860 | 7/1997 | Bush et al. . | |

FOREIGN PATENT DOCUMENTS

| | | |
|---|---|---|
| 498275 | 8/1992 | European Pat. Off. . |
| 549050 | 6/1993 | European Pat. Off. . |
| 649684 | 4/1995 | European Pat. Off. . |
| 733559 | 9/1996 | European Pat. Off. . |
| 747292 | 12/1996 | European Pat. Off. . |
| 9419268 | 1/1995 | Germany . |
| WO 90/05091 | 5/1990 | WIPO . |

*Primary Examiner*—Steven O. Douglas
*Assistant Examiner*—Peter deVore
*Attorney, Agent, or Firm*—Oblon, Spivak, McClelland, Maier & Neustadt, P.C.

[57] ABSTRACT

A dispenser (1) for a liquid product (P), provided with a dispensing head (7) has an axially movable push button (26) defining a pumping chamber (22) having an intake opening (14) for the product, obturated by an admission valve (16) carried by a piston (12). The piston has at least one sealing lip (12*a*, 12*b*) in contact such that the internal sides are displaced between a high position and a low position, the passing from the low position to the high position causing the product to be drawn in and the reverse passing causing the drawn-in product to emerge through a dispensing valve (40). A spring (32) is provided for restoring the push button (26) into its high position. The admission valve (16) and the piston (12) are mounted on a collar (4) having a seat (18) for the admission valve (16). The sealing lip (12*a*, 12*b*) is made of a rigid or semi-rigid material, and the admission valve (16) is formed by a membrane made of a flexible material.

26 Claims, 2 Drawing Sheets

26

DISPENSER PUMP FOR A LIQUID OR PASTY PRODUCT

BACKGROUND OF THE INVENTION

1. Field of the Invention

The present invention relates to a dispensing head for a liquid or pasty product, as well as a dispenser fitted with this dispensing head and comprising a reservoir for the product to be dispensed, there being provided pumping means actuatable by a push button provided for causing a dose of the product to be dispensed. The reservoir has a variable volume and is constituted, for example, by a flexible pouch or by a rigid cylindrical reservoir provided with a follower piston. The dispenser is particularly intended for dispensing and applying a cosmetic, dermatological or food product, such as, for example, a lotion, cream, shampoo, liquid foundation or gel, but any kind of liquid or pasty product may be dispensed. Such a dispenser advantageously takes a compact form with a reservoir of small capacity ranging, for example, from approximately 10 mm to some hundreds of mm.

2. Description of the Related Art

A dispenser of the kind described above is known, for example, from EP-A-0 733 559 which has a retractable reservoir connected by a first valve to a chamber whose volume is variable under the action of a push button. This variable volume chamber is itself connected to the outside by a second valve. The push button has a body which, together with the piston joined to the reservoir, constitutes the chamber with a variable volume. The piston is provided with a central duct, its free end on the side of the chamber being surmounted by an elastomer part which performs both the function of a sealing lip and of a one-way shutter valve capable of opening towards the variable volume chamber in response to low pressure in the chamber.

Trials undertaken by the Applicant have shown that the valve in accordance with EP-A-0 733 559 has two drawbacks. First, adjustment of a sealing lip made of an elastomeric material sliding between two rigid sides is difficult to obtain, in particular when the piston is only a few mm in diameter. Second, it is difficult to ensure movability of the piston because, depending on their chemical composition, certain products have a tendency to distend the elastomeric material constituting the piston, the latter then expanding and jamming in the chamber, and/or deforming the valve.

The dispenser is known from Utility Model DE-U-94 19268 has a compression chamber with a variable volume communicating with a piston having a central duct for the product obturated by a one-way valve. The piston is inserted inside a feeder duct communicating with a reservoir containing the product. The valve is in the form of an annular elastic membrane whose central opening is obturated by a pin carried by the piston. The membrane is joined to a cylindrical sleeve fitted in an annular groove in which the upper end of the piston is provided. The sleeve with the valve is made of a single elastomeric part.

Such a design has several drawbacks, both from the point of view of its manufacture and the point of view of its operation: indeed, during the mounting of the piston, it is necessary to provide a first seal between the piston and the sleeve while ensuring the correct axial positioning of the membrane relative to the pin. In the absence of an accurate positioning of the membrane, the pump has leaks or the delivery is not constant.

Furthermore, a second seal has to be ensured between the feeder duct and the piston. Because of the mounting of the piston inside the feeder duct, the cross-section for the passing of the product is restricted, which leads to a loss of pressure, requiring a hard operation of the pump. If this passage cross-section is increased, a bulky pump is obtained which cannot be associated with a dispensing head intended to surmount reservoirs of a small capacity. In all, two steps are necessary for mounting the piston in the pump. In the absence of a leakproof mounting of the various above mentioned components, the functional reliability of the pump is compromised.

SUMMARY OF THE INVENTION

It is an object of the present invention to remedy the above drawbacks and to ensure a smooth and reliable operation of a dispenser.

It is a further object of the invention to provide a dispenser having a fast response when the push button is actuated, as compared to the dispensers which have a ball valve.

It is yet a further object of the invention to provide a dispenser having a piston with a valve, whose manufacture and mounting are easily carried out at reasonable cost and which are, moreover, very accurate.

According to a feature of the invention, the above and other objects are carried out by a head for dispensing a product of a liquid-to-pasty consistency contained in a reservoir, and comprising a collar mounted to the reservoir and having at least one opening communicating with the reservoir; an axially movable push button movably mounted to said collar, said push button having a body whose internal sides define a pumping chamber having a product outlet; a piston mounted to said collar, said piston having a substantially rigid annular part and at least one sealing lip in slidable sealing contact with the internal sides of the push button body so as to be displaceable between a high position and a low position to vary the volume of said pumping chamber; a membrane supported by said piston and having an opening through which the product in the reservoir may reach said pumping chamber via said opening of said collar; a seat mounted to the collar and cooperating with said opening of said membrane, when said membrane is undeformed, to form an admission valve which obturates an inlet of the pumping chamber and prevents the return of the product in said pumping chamber to the reservoir; and an elastic restoring element which biases the push button toward the high position, thereby reducing the pressure in said pumping chamber and deforming said membrane and opening said admission valve.

The invention also relates to a dispenser provided with the head described above.

According to an aspect of the invention, the annular part is shaped so as to ensure the mounting of the piston on an intake duct carrying the seat, this annular part being positioned outside the intake duct. In this way, the intake duct does not have any restriction, and losses of pressure are avoided during the actuation of the pump. Advantageously, the mounting of the membrane on the seat is leakproof, at least when pressure is exerted on the piston by the product, which is especially suitable for dispensing relatively viscous products. The mounting of the membrane on the seat may be permanently leakproof, which is especially suitable for dispensing relatively fluid products.

In order to increase the operational reliability of this dispensing head, the annular part of the piston may advantageously comprise a portion forming a stop, so as to ensure the precise positioning of the central part of the piston on the seat along the longitudinal axis of the pump.

Advantageously, the elastically deformable membrane is fixed to the end portion of the piston during the manufacture of the latter. For this purpose, the admission valve and the annular part may be made by duplicate injection molding or overmolding of two compatible materials. For the injection molding of the membrane, an elastomeric material is preferably used, especially a thermoplastic material, and more particularly a material having a Shore A hardness of from 15 to 90. Generally, the elastically deformable material should be capable of creating a solid bond with the rigid or semi-rigid material during the manufacture of the piston. Thus, for example, by first injecting the rigid or semi-rigid material into an appropriate mold to form the piston, and by subsequently overinjecting the elastomeric material of the membrane, this bond is created by thermal fusion between the two materials. It is also possible to operate in a reverse order. In certain cases it is also possible to mould two incompatible materials over one another, on condition that anchorage profiled parts are provided.

The elastomeric material is advantageously chosen from the group of thermoplastic elastomers, such as the group of the copolymers of propylene/ethylene; polyether blocamides; polyvinyls; terpolymers of ethylene, propylene and of a diene (EPDM); sequenced polymers of styrene-butadiene (SBS); sequenced polymers of styrene-ethylene-butadiene (SEBS-SIS); thermoplastic polyurethanes; mixtures of polypropylene with one of the following elastomers: sequenced polymers of styrene-ethylene-butadiene (SEBS-SIS); terpolymers of ethylene, of propylene and of a diene (EPDM); sequenced polymers of styrene-butadiene (SBS). It is also possible to use as the flexible material, the elastomers of silicone, butyl or nitrile rubbers, latex or elastomers containing fluorene.

It is also possible to make the membrane of natural or synthetic rubber such as vulcanizable elastomers, nitrile rubbers or polybutadienes, etc; in this case, the membrane may be bonded to, or be catch-engaged to the piston, or be fixed by any other appropriate means.

For manufacture of the piston itself, the rigid or semi-rigid material is chosen from polypropylenes, high and low density polyethylenes, polyvinyl chlorides (PVC), polyacetals, ethylene vinyl acetates and their mixtures, etc. Advantageously, the piston has a general cylindrical shape, each end of the cylinder having an annular portion in the form of a sealing lip. To ensure a good contact of these sealing lips with the internal side of the pumping chamber, these lips may have a decreasing thickness in the direction towards their free end, as viewed in section, which imparts greater flexibility to them.

According to a first embodiment of the invention, the membrane is pierced at its center by an opening with a cross-section smaller than the cross-section of the seat, this seat being centered at the top of an intake duct formed by the collar and passing through the piston. Advantageously, the membrane takes a circular shape, similar to a flat washer. In this configuration, the hollow piston is provided with a central pin performing the function of a seat, disposed so as to come into contact with the edges of the opening of the membrane. This arrangement constitutes a one-way valve allowing the product to be admitted into the pumping chamber. When excess pressure exists in this chamber, the membrane, and in particular the edges of the opening, bear (bears) in a leakproof manner on the seat, while low pressure in the chamber causes the edges of the opening of the membrane to be detached from its seat, allowing the product to be drawn in. To impart more flexibility to this membrane, the edges of the opening may be provided with one or several radial slots, or in the form of circular fractions. Advantageously, the pin has a concave surface, thus forming a thin peripheral edge which bears in the rest position on the membrane, so as to ensure a perfect seal.

According to a second embodiment, the membrane has a plurality of openings in the form of concentric slots. In this case, the seat is constituted by an annular part at the top of an intake duct formed by the collar. Advantageously, this annular part may comprise an annular edge intended to bear on the membrane in the rest position. Preferably, the slots are disposed discontinuously along a circular line. In this configuration, the hollow piston is provided with an enlarged end edge forming a seat, disposed so as to come into contact with the membrane at the level of the slots. As in the first embodiment, this arrangement constitutes a valve for the admission of the product into the pumping chamber. When excess pressure exists in this chamber, the membrane, and in particular the edges of the slots, bears (bear) in a leakproof contact on the seat, while low pressure causes the membrane to be detached from its seat, allowing the product to be drawn in.

To increase the flexibility of the membrane still further, its thickness may be variable. Thus, the zone of the membrane, or the adjoining regions which are in contact with the seat, may have a lesser thickness than the rest of the membrane.

According to a preferred embodiment of the dispenser of the invention, the collar comprising the intake duct is centered on the longitudinal axis of the dispenser and opens out directly on the admission valve of the dispensing head. This intake duct is surrounded by an annular portion forming a cavity all around the intake duct, the cavity being delimited on the opposite side to the intake duct by an external annular skirt carrying means for the fastening onto the dispenser, for example an annular groove or rib.

Advantageously, the said cavity has a transverse partition between the intake duct and the external annular skirt, the elastic restoring means being positioned between a shoulder formed by the push button and this transverse partition. The restoring means are constituted, for example, by a metal helical spring disposed around the pumping chamber and the piston in the cavity. In a variant of the embodiment, the spring may be obtained directly by molding a plastic rigid or semi-rigid material, at the same time as the lower part of the push button with it forms an integral part.

The reservoir may be constituted by a soft and flexible pouch, having an open end joined to the collar and communicating with the intake duct arranged in the piston. In this case, the open end of the pouch is closed by the collar which has fastening means cooperating with an end edge of a rigid or semi-rigid external shell surrounding the pouch.

The reservoir may instead be constituted by a rigid or semi-rigid shell communicating with the intake duct, the fastening means cooperating with an end edge of the rigid or semi-rigid external shell, a follower piston being disposed in the bottom of the reservoir. This follower piston is capable of advancing automatically along the longitudinal axis of the dispenser as the product is being taken up, in response to a low pressure in the pumping chamber.

According to another advantageous aspect of the invention, the push button comprising the dispensing valve is provided with a dispensing duct, one end of which opens out in the pumping chamber, the second being closed by the dispensing valve. For this purpose, this dispensing valve is made of an elastomeric material and bears elastically in a leakproof manner against a seat formed around the second end of the of the dispensing duct, capable of opening when a thrust of the product is exerted, and being applied against the seat when low pressure is produced inside the chamber with a variable volume and the dispensing duct.

BRIEF DESCRIPTION OF THE DRAWINGS

To render the present invention more readily understood, embodiments of dispensers in accordance with the invention will now be described by way of purely illustrative and non-restrictive drawings, in which.

DETAILED DESCRIPTION OF THE PREFERRED EMBODIMENTS

Figure 1:
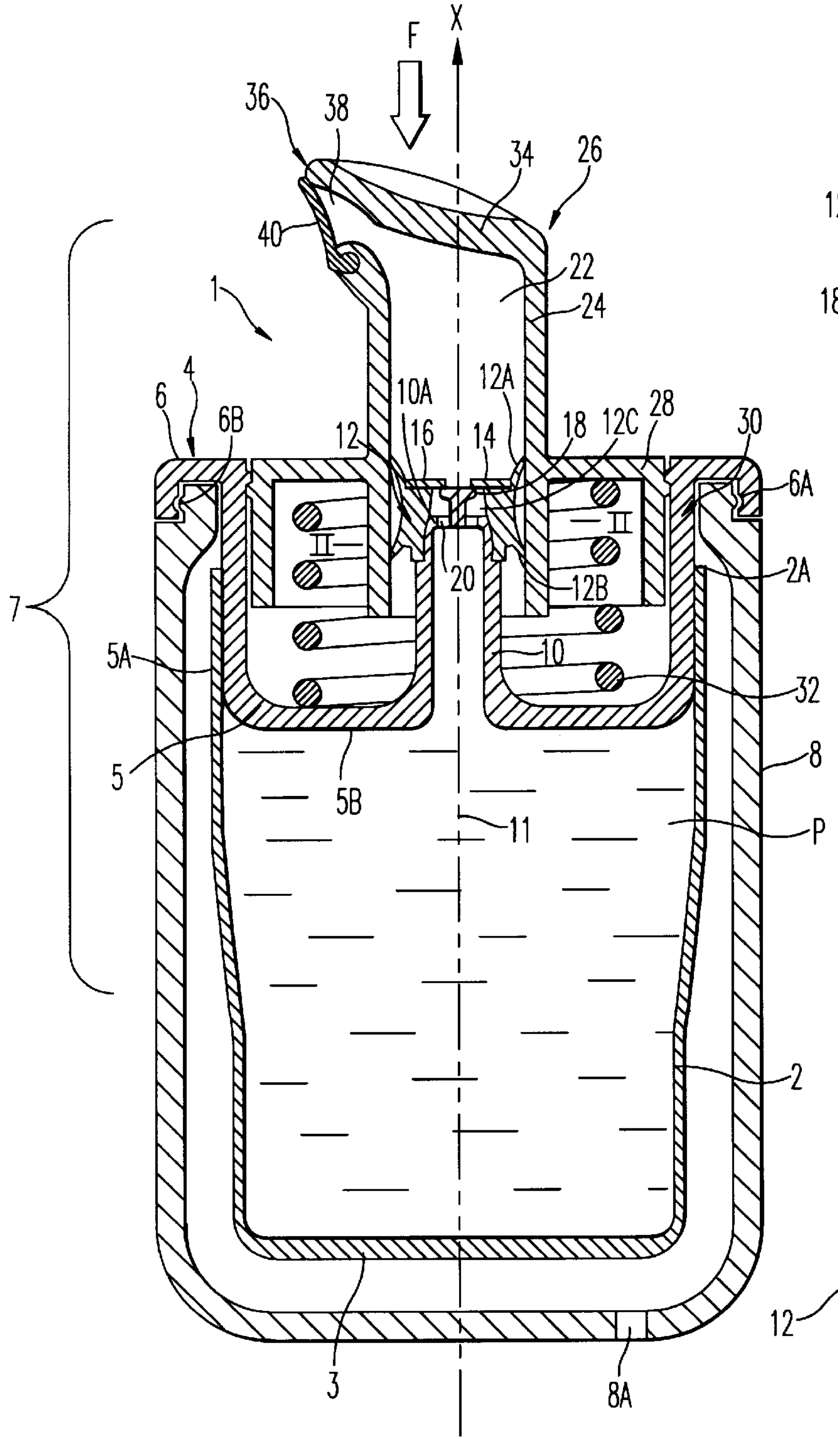
FIG. 1 is a schematic view in an axial section of a dispenser according to a first embodiment of the invention.
Figure 2:
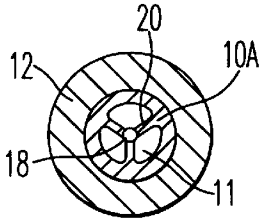
FIG. 2 is a sectional view along line II—II in FIG. 1.

FIG. 1 illustrates a dispenser 1 comprising a flexible reservoir 2 provided with a collar 4 whose circumference is catch-engaged by a groove 6*a*/bead 6*b* system on a rigid external shell 8 which surrounds the flexible reservoir 2. The collar 4 forms a bowl 5 having an external cylindrical side wall 5*a* and a transverse bottom 5*b*. The flexible reservoir 2 is formed by a cylindrical sheath made, for example, of a flexible multilayer sheet of polyethylene/aluminum/polyethylene. The upper portion 2*a* of the flexible reservoir 2 is welded or bonded to the side wall 5*a* of the bowl 5. After the reservoir has been filled with a product P to be dispensed via its lower end, this end is closed by welding, the weld line forming the bottom 3.

The reservoir 2 forms a flexible pouch which can be deformed as the product P is being dispensed. The rigid shell 8 surrounding the flexible reservoir 2 is provided with a vent opening 8*a* intended to equalize the internal pressure in the space defined between the pouch 2 and the shell 8.

The center of the bowl 5 is open and extends towards the top in a central duct 10 forming the base of a piston 12. The central duct 10 defines a channel 11 for drawing in the product. One end of the channel communicates with the reservoir, the second end carrying the piston 12. The piston 12 is hollow and is provided with a central opening 14 cut in an elastic membrane 16 which has been deposited by duplicate injection molding of an appropriate elastomeric thermoplastic material, for example Santoprene ® (EPDM, sold by the MONSANTO Company) on the upper end of the piston 12.

The piston 12 has a general cylindrical shape, each end of the cylinder being provided with a circular sealing lip 12*a* and 12*b* (see FIG. 3) of a small thickness, with a taper at its free end. Advantageously, the piston is made of a semi-rigid material, such as low density polyethylene capable of imparting a certain flexibility to the sealing lips 12*a* and 12*b*. A central pin 18 obturates the opening 14 in the state of rest. The pin 18 is held in position by radial tabs 20 joined to the upper end 10*a* of the central duct 10. The upper end 10*a* bears against an annular stop 12*c* cut inside the piston 12, thereby permitting an accurate positioning of the membrane 16 relative to the pin 18.

The membrane 16 and the pin form a valve intended for the admission of the product P into the variable volume pumping chamber 22. This chamber 22 is defined by the internal volume of a cylindrical tube 24 which forms part of a push button 26. The tube 24 has an internal diameter which is sufficient to permit leakproof sliding of the piston 12 and extends halfway down the side wall 5*a* in the bowl 5.

The tube 24 has a circular plate 28 extending radially towards the outside, whose circumference is bent at right angles and thus forms a cylindrical skirt 30 capable of sliding axially in the bowl 5. An elastically compressible helical metal spring 32 is disposed between the bottom of the bowl 5 and the plate 28. A double stop system is provided on the skirt 30 and the upper portion of the side wall 5*a* to keep the push button 26 in the bowl 5, this push button then being axially movable against the restoring force of the spring 32.

At its upper end, the tube 24 is closed by an oblique transverse side 34 which has a concave shape and on which the user places his finger for dispensing the product P. The upper end of the push button 26 also has a dispensing opening 36 communicating with the chamber 22 via a dispensing duct 38. The dispensing opening 36 is closed by an elastic dispensing valve 40 capable of preventing air from reentering into the pumping chamber 22, but capable of opening under the thrust of the product coming from the pumping chamber. The push button 26 provided with the dispensing valve 40, and the collar 4 provided with the piston 12 form a dispensing head 7.

For dispensing a dose of the product P, it suffices to press axially on the side 34 of the push button 26 in the direction of arrow F (see FIG. 1) to cause the tube 24 to be lowered into the bowl 5, and thus reduce the volume of the pumping chamber 22 by compressing the spring 32. During this reduction in volume, a given volume of air is pushed out of the chamber 22, through the dispensing opening 36 and via the elastic valve 40. By relaxing the force on the push button 26, the restoring force of the spring returns the latter into its initial position, which produces a low pressure in the chamber 22. This low pressure is sufficient to detach the membrane 16 from the central pin 18 and to draw in a dose of the product P from the pouch 2.

When the chamber 22 is initially empty, a few successive presses on the push button 26 suffice to fill the chamber 22 and the dispensing duct 38 with the product P. The product drawn in is subsequently ejected to the outside by via the dispensing valve 40. During the ejection of the product, the excess pressure inside the chamber 22 keeps the admission valve 16, 18 closed by pressing the membrane 16 onto the pin 18.

Figure 4:
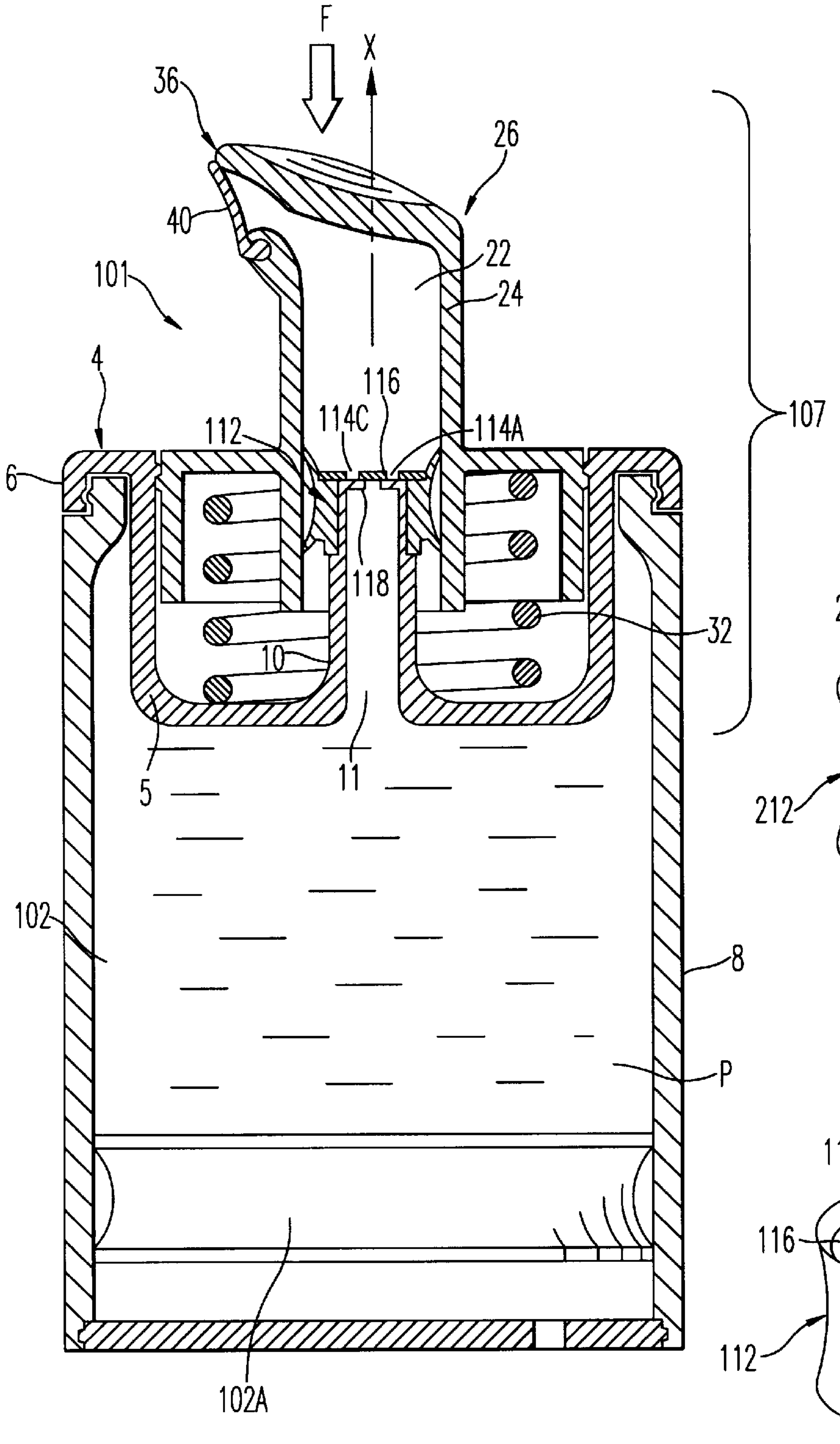
FIG. 4 is a schematic view in axial section of a dispenser according to a second embodiment of the invention.
Figure 5:
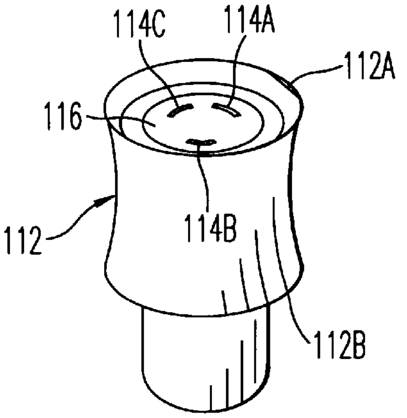
FIG. 5 is a perspective view of the piston shown in FIG. 4.

FIGS. 4 and 5 show a second embodiment in which the dispenser 101 differs from that shown in FIG. 1 by the absence of the pouch, and an admission valve of a different design. In FIG. 4, the parts identical with those of FIG. 1 bear the same reference numerals and their description will only be repeated succinctly; the parts that are different but perform a function similar to that of FIG. 1 bear reference numerals increased by 100.

As may be seen in FIG. 4, a product reservoir is delimited by a rigid external shell 8 with a cylindrical cross-section, at the bottom of which there is disposed a follower piston 102*a*. During the dispensing of the product P, this piston 102*a* undergoes axial displacement along axis X in the direction towards the push button 26, due to the low pressure created by the chamber 22 with a variable volume. The cylindrical shell 8 has a fixed bottom 108*b* provided with a vent opening 108*a*.

In a manner similar to the embodiment of FIG. 1, the dispenser 101 of FIG. 4 has a dispensing head 107 having a collar 4 surmounting the rigid shell 8, this collar being shaped as a bowl 5. The center of the bowl 5 is traversed by a duct 11 for drawing in the product and extended upwards by a central duct 10 whose top carries a piston 112. The piston 112 is provided with three discontinuous slots 114*a*–114*c* disposed on a circular line cut in an elastically deformable membrane 116 which has been deposited by bonding, catch engagement or duplicate injection molding of an appropriate elastomeric material on the upper end of the piston 112. The piston 112 has a general cylindrical shape, each end of the cylinder being provided with a circular sealing lip 112*a* and 112*b* (see FIG. 5). Apart from the membrane 116, the piston 112 is made of rigid or semi-rigid material, such as low density polyethylene, yet ensuring by a relatively small thickness of the lips 112*a* and 112*b* a leakproof and soft sliding in the cylindrical part 24 of the push button 26. Advantageously, other parts of the dispenser 101, such as the push button 26, the collar 4 and the rigid shell 8 are made of a rigid thermoplastic material such as polypropylene.

The central duct 10 has an upper end provided with an opening defining an annular edge 118 forming a seat, whose diameter is chosen so that the edge 118 completely obturates the slots 114*a*–114*c* in the undeformed position of the membrane. The membrane 116 and the annular edge 118 form a valve intended for the admission of the product P into the pumping chamber 22 with a variable volume. When excess pressure exists in the pumping chamber 22, the product contained in the chamber 22 cannot drop into the reservoir 102 since the edges of the slots 114*a*–114*b* are applied in a leakproof manner against the seat 118. When low pressure is created in the chamber 22 after a product dose has been dispensed, the edges of the slots 114*a*–114*c* are detached from the seat 118 and some of the product P is drawn in.

Figure 3:
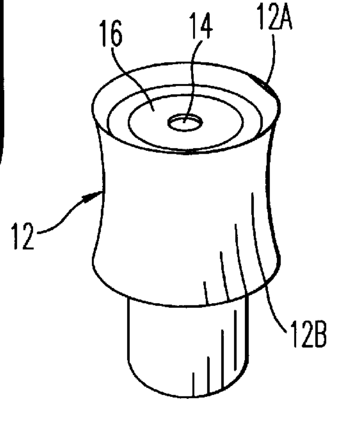
FIG. 3 is a perspective view of the piston shown in FIG. 1.
Figure 6:
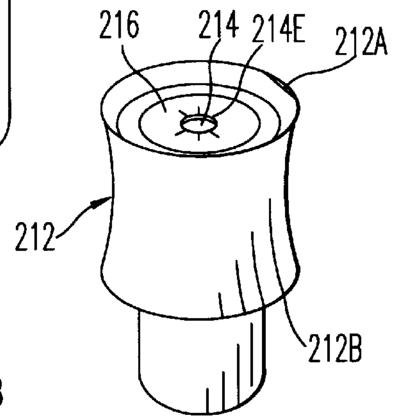
FIG. 6 is a perspective view of a variant of the piston of FIG. 3.

FIG. 6 shows a variant of the embodiment of the piston of FIG. 3. The piston 212 of FIG. 6 comprises two annular sealing lips 212*a*, 212*b* which are disposed at each end of the piston. The thickness of these lips decreases, so that the end zone intended to come into contact with the internal side of the chamber only has a thickness of some hundredths of a millimeter. A membrane 216 made of an elastomer and provided with a central opening 214, is disposed by duplicate injection molding or overmolding on the upper portion of the piston. In the membrane there are cut several radial slots 214*a* extending from the opening 214 as far as the vicinity of the circumference of the membrane. As compared with the embodiment of FIG. 3, the piston of FIG. 6 is designed for a larger product delivery and more flexible operation.

Moreover, the pumping system need occupy only a small space to allow it to be integrated into a dispenser. Thus, in accordance with the invention, a pump is advantageously used which has a piston whose diameter is from 4 mm to 15 mm, and preferably from approximately 5 mm to 10 mm. This allows a dispenser to be of a particularly compact shape of small height. It is thus possible to make the dispensing head in a particularly small size. It is another feature of the invention that it is possible to make dispensers at a particularly advantageous cost price.

What is claimed is:

1. A head for dispensing a product of a liquid-to-pasty consistency contained in a reservoir, comprising:

a collar mounted to the reservoir and having at least one opening communicating with the reservoir;

an axially movable push button movably mounted to said collar, said push button having a body whose internal sides define a pumping chamber having a product outlet;

a piston mounted to said collar, said piston comprising a substantially rigid annular part and having at least one sealing lip in slidable sealing contact with the internal sides of the push button body so as to be displaceable between a high position and a low position to vary the volume of said pumping chamber;

a membrane supported by said piston and having an opening through which the product in the reservoir may reach said pumping chamber via said opening of said collar;

a seat mounted to the collar and cooperating with said opening of said membrane, when said membrane is undeformed, to form an admission valve which obturates an inlet of the pumping chamber and prevents the return of the product in said pumping chamber to the reservoir; and an elastic restoring element which biases the push button toward the high position, thereby reducing the pressure in said pumping chamber and deforming said membrane and opening said admission valve, wherein a zone of the membrane surrounding the opening has a plurality of radial slots.

2. A head for dispensing a product of a liquid-to-pasty consistency contained in a reservoir, comprising:

a collar mounted to the reservoir and having at least one opening communicating with the reservoir;

an axially movable push button movably mounted to said collar, said push button having a body whose internal sides define a pumping chamber having a product outlet;

a piston mounted to said collar, said piston comprising a substantially rigid annular part and having at least one sealing lip in slidable sealing contact with the internal sides of the push button body so as to be displaceable between a high position and a low position to vary the volume of said pumping chamber;

a membrane supported by said piston and having an opening through which the product in the reservoir may reach said pumping chamber via said opening of said collar;

a seat mounted to the collar and cooperating with said opening of said membrane, when said membrane is undeformed, to form an admission valve which obturates an inlet of the pumping chamber and prevents the return of the product in said pumping chamber to the reservoir; and an elastic restoring element which biases the push button toward the high position, thereby reducing the pressure in said pumping chamber and deforming said membrane and opening said admission valve, wherein the opening of said membrane comprises a plurality of concentric slots.

3. The dispensing head according to claim 1 or 2, wherein said collar has an intake duct communicating with the reservoir, and said piston is mounted to said collar via said annular part and is positioned outside said annular part.

4. The dispensing head according to claim 3, wherein the annular part of the piston comprises a portion forming a stop which cooperates with said intake duct to ensure precise positioning of said piston relative to said seat.

5. The dispensing head according to claim 1 or 2, wherein the membrane is mounted to said piston in a leakproof manner.

6. The dispensing head according to claim 5, wherein the admission valve is leakproof.

7. The dispensing head according to claim 1 or 2, wherein said membrane is molded to said annular part.

8. The dispensing head according to claim 1 or 2, wherein said annular part has a thickness decreasing in the direction towards the free end of the at least one lip.

9. The dispensing head according to claim 1 or 2, wherein said membrane has a variable thickness.

10. The dispensing head according to claim 1 or 2, wherein the membrane is formed of an elastomeric material.

11. The dispensing head according to claim 1 or 2, wherein said membrane is formed of an elastically deformable material chosen from elastomers of copolymers of propylene/ethylene; polyether blocamides; polyvinyls; terpolymers of ethylene, propylene and of a diene (EPDM); sequenced polymers of styrene-butadiene (SBS); sequenced polymers of styrene-ethylene-butadiene (SEBS-SIS); thermoplastic polyurethanes; mixtures of polypropylene with one of the following elastomers: sequenced polymers of styrene-ethylene-butadiene (SEBS-SIS); terpolymers of ethylene, of propylene and of a diene (EPDM); sequenced polymers of styrene-butadiene (SBS); elastomers of silicone, butyl or nitrile rubbers, latex or elastomers containing fluorene.

12. The dispensing head according to claim 1 or 2, wherein the membrane is formed of a material having a Shore A hardness of from 15 to 90.

13. The dispensing head according to claim 1 or 2, wherein said annular part is made from a material is chosen from high and low density polyethylenes, polypropylenes, polyvinyl chlorides, polyacetals, and ethylene vinyl acetates.

14. The dispensing head according to claim 1 or 2, wherein the opening of said membrane has a cross-section smaller than the cross-section of the said seat, said seat being centered at the top of an intake duct formed by the said collar.

15. The dispensing head according to claim 2, wherein said seat is comprised by an annular part at the top of an intake duct formed by said collar.

16. A dispenser, for a product of a liquid-to-pasty consistency, comprising a reservoir fitted with a dispensing head comprising:

a collar mounted to the reservoir and having at least one opening communicating with the reservoir;

an axially movable push button movably mounted to said collar, said push button having a body whose internal sides define a pumping chamber having a product outlet;

a piston mounted to said collar, said piston comprising a substantially rigid annular part and having at least one sealing lip in slidable sealing contact with the internal sides of the push button body so as to be displaceable between a high position and a low position to vary the volume of said pumping chamber;

a membrane supported by said piston and having an opening through which the product in the reservoir may reach said pumping chamber via said opening of said collar;

a seat mounted to the collar and cooperating with said opening of said membrane, when said membrane is undeformed, to form an admission valve which obturates an inlet of the pumping chamber and prevents the return of the product in said pumping chamber to the reservoir;

an elastic restoring element which biases the push button toward the high position, thereby reducing the pressure in said pumping chamber and deforming said membrane and opening said admission valve; and a substantially rigid external shell containing a flexible pouch, wherein the flexible pouch has an open end joined to the collar.

17. The dispenser according to claim 16, wherein the collar has an axial intake duct communicating with the admission valve, said intake duct being surrounded by an annular portion forming a cavity all around the intake duct, said cavity being delimited on a side opposite the intake duct by an external annular skirt carrying a part for the fastening onto the reservoir, and wherein the flexible pouch communicates with said intake duct, the fastening part cooperating with an end edge of said external shell.

18. A dispenser, for a product of a liquid-to-pasty consistency, comprising a reservoir fitted with a dispensing head comprising:

a collar mounted to the reservoir and having at least one opening communicating with the reservoir;

an axially movable push button movably mounted to said collar said push button having a body whose internal sides define a pumping chamber having a product outlet;

a piston mounted to said collar, said piston comprising a substantially rigid annular part and having at least one sealing lip in slidable sealing contact with the internal sides of the push button body so as to be displaceable between a high position and a low position to vary the volume of said pumping chamber;

a membrane supported by said piston and having through which the product in the reservoir may reach said pumping chamber via said opening of said collar;

a seat mounted to the collar and cooperating with said opening of said membrane, when said membrane is undeformed, to form an admission valve which obturates an inlet of the pumping chamber and prevents the return of the product in said pumping chamber to the reservoir;

an elastic restoring element which biases the push button toward the high position, thereby reducing the pressure in said pumping chamber and deforming said membrane and opening said admission valve; and a follower piston disposed in the bottom of the reservoir.

19. The dispenser according to claim 16 or 18, wherein the collar has an axial intake duct communicating with the admission valve, said intake duct being surrounded by an annular portion forming a cavity all around the intake duct, said cavity being delimited on a side opposite the intake duct by an external annular skirt carrying a part for the fastening onto the reservoir.

20. The dispenser according to claim 19, wherein said cavity has a transverse partition between the intake duct and the external annular skirt, said elastic restoring element being positioned between a shoulder formed by the push button and said transverse partition.

21. The dispenser according to claim 19, wherein said reservoir comprises a substantially rigid external shell communicating with the intake duct, the fastening part cooperating with an end edge of the external shell.

22. The dispenser according to claim 16 or 18, wherein the product is one of a cream, a gel and a liquid foundation.

23. A head for dispensing a product of a liquid-to-pasty consistency contained in a reservoir, comprising:

a collar mounted to the reservoir and having at least one opening communicating with the reservoir;

an axially movable push button movably mounted to said collar, said push button having a body whose internal sides define a pumping chamber having a product outlet;

a piston mounted to said collar, said piston comprising a substantially rigid annular part and having at least one sealing lip in slidable sealing contact with the internal sides of the push button body so as to be displaceable between a high position and a low position to vary the volume of said pumping chamber;

a membrane supported by said piston and having an opening through which the product in the reservoir may reach said pumping chamber via said opening of said collar;

a seat mounted to the collar and cooperating with said opening of said membrane, when said membrane is undeformed, to form an admission valve which obturates an inlet of the pumping chamber and prevents the return of the product in said pumping chamber to the reservoir; and an elastic restoring element which biases the push button toward the high position, thereby reducing the pressure in said pumping chamber and deforming said membrane and opening said admission valve, wherein the membrane is formed of an elastically deformable material, and wherein said annular part of the piston is formed of a material which is different from said elastically deformable material.

24. The dispensing head according to claim 23, wherein said elastically deformable material is an elastomeric material.

25. The dispensing head according to claim 24, wherein said elastomeric material is a molded material which is molded by dual molding onto said substantially rigid annular part of said piston.

26. The dispensing head according to claim 23, wherein said membrane is situated on a free extremity of said piston, opposite to said collar.

* * * * *